US008206542B2

(12) United States Patent
Van Houten et al.

(10) Patent No.: US 8,206,542 B2
(45) Date of Patent: Jun. 26, 2012

(54) METHOD FOR MANUFACTURING BAMBOO MATS, BAMBOO MATS AND USE THEREOF

(75) Inventors: Edwin Van Houten, BT Nieuwegein (NL); Ireneus Alexis Wilhelmus Zaal, HM Hoorn (NL)

(73) Assignee: Moso International B.V., Zwaag (NL)

( * ) Notice: Subject to any disclaimer, the term of this patent is extended or adjusted under 35 U.S.C. 154(b) by 109 days.

(21) Appl. No.: 12/312,908

(22) PCT Filed: Dec. 3, 2007

(86) PCT No.: PCT/NL2007/050616
§ 371 (c)(1),
(2), (4) Date: Sep. 25, 2009

(87) PCT Pub. No.: WO2008/066386
PCT Pub. Date: Jun. 5, 2008

(65) Prior Publication Data

US 2010/0028589 A1 Feb. 4, 2010

(30) Foreign Application Priority Data

Dec. 1, 2006 (NL) ..................................... 2000349

(51) Int. Cl.

| | |
|---|---|
| ***B29C 65/00*** | (2006.01) |
| ***B32B 37/02*** | (2006.01) |
| ***B32B 38/04*** | (2006.01) |
| ***B32B 38/10*** | (2006.01) |

(52) U.S. Cl. ........ 156/254; 156/264; 156/265; 156/299; 156/192; 144/333

(58) Field of Classification Search .................. 156/254, 156/263, 264, 265, 299, 192; 144/333, 340, 144/353, 355, 366, 367, 369, 370, 376
See application file for complete search history.

(56) References Cited

U.S. PATENT DOCUMENTS

| | | | | |
|---|---|---|---|---|
| 4,674,967 A | | 6/1987 | Oseka | |
| 5,896,903 A | * | 4/1999 | Chen et al. | 144/350 |
| 7,021,346 B2 | * | 4/2006 | Chang | 144/333 |
| 2003/0121620 A1 | | 7/2003 | Chen | |
| 2005/0161116 A1 | | 7/2005 | Chang | |

FOREIGN PATENT DOCUMENTS

| | | | | |
|---|---|---|---|---|
| CN | 1197720 | | | 11/1998 |
| CN | 1401464 | | | 3/2003 |
| DE | 202005000380 | | | 3/2005 |
| GB | 2292336 | | | 2/1996 |
| GB | 2363753 | | | 1/2002 |
| NL | 1019971 | C | | 7/2003 |
| TW | 396100 | | * | 7/2000 |

* cited by examiner

*Primary Examiner* — Linda L Gray
(74) *Attorney, Agent, or Firm* — Novak Druce + Quigg LLP

(57) ABSTRACT

A method for manufacturing bamboo mats which also relates to the use of such bamboo mats including bamboo mats and products manufactured from such bamboo mats. This method is found to produce bamboo mats with an improved form-retention and durability compared to known bamboo mats made of strips obtained directly from the 'wet' bamboo stem. The bamboo mats can be used in interior construction, for instance for furniture or the covering of floors, walls and ceiling.

10 Claims, 4 Drawing Sheets

METHOD FOR MANUFACTURING BAMBOO MATS, BAMBOO MATS AND USE THEREOF

CROSS REFERENCE TO RELATED APPLICATIONS

This application is the entry into the United States of International Application No. PCT/NL2007/050616 filed Dec. 3, 2007 and claims priority from Netherlands Application No. 2000349 filed Dec. 1, 2006, the entirety of each of which are hereby incorporated by reference.

BACKGROUND OF THE INVENTION

The invention relates to a method for manufacturing bamboo mats. The invention also relates to the use of such bamboo mats. The invention further relates to bamboo mats and products manufactured from such bamboo mats.

It is known to process bamboo into bamboo strips, wherein the strips are cut directly from a 'wet' bamboo stem. Diverse products, such as mats, can be made herefrom. A drawback is that bamboo strips have a certain curvature and are found to deform a great deal in the course of time. Bamboo strips are hereby only suitable for low-grade applications.

A known application of bamboo strips is the production of bamboo mats, wherein a plurality of parallel bamboo strips are mutually connected. In the case of the known bamboo strips this however results in a low-grade product with poor durability and form-retention.

SUMMARY OF THE INVENTION

It is an object of the invention to provide bamboo mats of a more higher-grade quality.

The invention provides for this purpose a method for manufacturing a bamboo mat, comprising the processing steps of A) processing bamboo into bamboo strips, B) drying the bamboo strips to a predetermined moisture content, C) machining at least the longitudinal sides of the bamboo strips dried according to step B) so as to form a uniform plane, D) parallel positioning of a plurality of machined bamboo strips with the longitudinal sides adjoining, and E) mutually connecting the parallel positioned bamboo strips by means of coupling means.

This method is found to produce bamboo mats with an improved form-retention and durability compared to known bamboo mats made of strips obtained directly from the 'wet' bamboo stem. The improved result is obtained in that the machining of the bamboo strips in step C) takes place after the drying in step B. The bamboo strips in the bamboo mat preferably have substantially equal dimensions in the final product. Form-retention is understood to mean that, although the bamboo mats still expand and contract under the influence of for instance air humidity, the form is here substantially retained at a relative air humidity of 50-65% and temperature between 15-25° C., while in conventional bamboo mats deformation does occur in similar conditions. The bamboo strips can be positioned at shorter mutual distances because the bamboo strips have a more regular form and tend to warp less in changing ambient conditions, in particular air humidity and temperature. The invention also provides a method for manufacturing a bamboo mat, comprising of adjacent parallel positioning of a plurality of bamboo strips according to the invention, and mutual connection of the bamboo strips by means of coupling means. A bamboo mat of improved quality is thus obtained in simple manner. Due to the form-retention of the bamboo strips according to the invention it is possible to work with lower tolerances, so that the intermediate space between two adjacent bamboo strips in the mat can be smaller. The bamboo mats according to the invention are hereby suitable for higher-grade applications, in particular for applications in interior construction, such as furniture upholstery, floor covering, wall covering and ceiling covering.

The processing of bamboo to bamboo strips comprises of machining the wet bamboo stem using usual techniques such as cutting, sawing and planing. Drying of the bamboo strips to a predetermined moisture content can take place in a special space with a predetermined moisture content or in the air if it has a suitable air humidity. The desired moisture content after drying must correspond as closely as possible to the environment in which the bamboo strips will be applied, preferably with a variation of a maximum of ±2% by weight of the average degree of humidity in the intended environment of use. Known methods for determining moisture contents are based on measurement of electrical resistance or the difference in weight between a wet and fully dried bamboo. Levelling at least the longitudinal sides of the dried bamboo strip makes use of techniques such as planing, cutting and sawing.

At nodes which occur in the bamboo (see the figures of the examples) the bamboo has a greater deformation than at other parts of the bamboo strip. By preferably parallel levelling of the longitudinal sides a rectangular cross-sectional profile is created which is constant over the full length of the bamboo strip, whereby the bamboo strips according to the invention can be positioned adjoining more closely, and this is advantageous for many bamboo products, such as bamboo mats. Different means can be envisaged as coupling means, such as for instance adhesive tape or wire, or a material layer such as textile or plastic film which connects the bamboo strips by means of glueing. It is advantageous to manufacture a large bamboo mat of a width of for instance 1000 bamboo strips, which in a later production step can be divided into a plurality of relatively small bamboo mats, bamboo strips or bamboo tiles of for instance 10 bamboo strips in width. Bamboo tiles of different dimensions can thus be manufactured in simple manner from one bamboo mat.

In a preferred embodiment, during the drying in step B a width of the bamboo strip is smaller at the position of at least one node in the bamboo than a maximum width of the bamboo strip, wherein during the machining in step C) bamboo is removed on the longitudinal sides of the bamboo strip until the bamboo strip has substantially the same width over the longitudinal direction. It is thus possible to manufacture a closely fitting bamboo mat from the bamboo strips. With the method according to the invention it is possible to realize an average distance between the adjoining bamboo strips of less than 0.5 mm. In bamboo mats manufactured according to the usual methods (so without machining C) the best result which can be achieved is generally between 0.5 and 1 mm, and larger gaps are sometimes even visible between the adjoining bamboo strips, particularly at the position of the nodes of the bamboo. Machining of the longitudinal sides can for instance take place by means of planing.

In a preferred embodiment a thickness of the bamboo strip at the position of at least one node in the bamboo is smaller during drying in step B than a maximum thickness of the bamboo strip, wherein during the machining in step C bamboo is removed from the top side and bottom side of the bamboo strip adjacent to the longitudinal sides until the bamboo strip has substantially the same thickness over the longitudinal direction. Machining and levelling the bottom side in this manner makes it readily possible to arrange the bamboo mat according to the invention flat on a flat surface or a carrier layer, wherein minimal stresses are caused in the bamboo material when the bamboo mat is for instance glued to a surface or carrier. Machining of the top side in this manner results in an exceptionally plane surface of the top side of the resulting bamboo mat. A product with a very regular form becomes possible when material is removed on all sides to the level of the bamboo strip at the position of the nodes.

The predetermined moisture content in step B) preferably lies between 6 and 12% by weight, more preferably between 6 and 10% by weight. The average degree of humidity and temperature indoors is found to result in exceptionally little deformation in the bamboo mats according to the invention, particularly at a relative degree of humidity between 50 and 65% relative to saturated air and temperatures between 15 and 25° C.

It is advantageous if the bamboo strips are machined to a thickness between 1 and 2.5 mm. Such strips are found to reduce the time required for the drying step. Bamboo strips smaller than 1 mm have too low a mechanical strength for many applications, and can be damaged relatively more easily in further machining steps.

The coupling means in step E) preferably comprise adhesive tape, wherein the adhesive tape is arranged over a plurality of adjoining bamboo strips such that the bamboo strips are coupled pivotally to each other. Adhesive tape can be arranged particularly quickly and easily and provides a good mutual fixation of the position of the bamboo strips, wherein the coupling can also readily pivot or hinge, whereby the mat can for instance be fully or partially rolled up.

In a preferred embodiment the coupling means in step E) comprise a flexible material layer which substantially covers adjoining bamboo strips on at least one side. A particularly firm fixation of the bamboo strips is thus achieved. The flexible layer preferably comprises a tensively strong material such as a fibre-reinforced plastic film, such as latex, polyethylene (PE) or polyurethane foam, or textile fabric such as jute. The flexible fabric can also have further functionality, such as heat insulation, for which purpose a flexible plastic film or a plastic foam can for instance be used. It is advantageous to combine different stacked flexible layers with different functionality, for instance in order of stacking a first adhesive layer, a tensively strong layer, a second adhesive layer and an insulating layer. The strengthening element can optionally be used in combination with other coupling means such as adhesive tape.

In a preferred embodiment, after the connecting as according to step E), the bamboo mat is narrowed to a predetermined width in a subsequent step F) by removing bamboo on either side parallel to the longitudinal direction of the bamboo strips. The natural curvature present in the width direction in bamboo strips can thus be corrected in simple manner. The thus obtained bamboo mats can be more easily placed together in a regular pattern, such as a covering for floor, wall or ceiling. In step F) at least 1 mm, more preferably at least 2 mm, is preferably removed in the width from the bamboo mat on either side in the longitudinal direction of the bamboo strips. The removal can for instance take place by sawing, planing or cutting.

It is advantageous if, prior to the narrowing in step F), the bamboo strips of the bamboo mat which are located at the outermost positions have a greater width than the bamboo strips located between the outermost positions, wherein the bamboo strips located at the outermost positions are narrowed during the narrowing of the bamboo mat to a width substantially equal to the width of the bamboo strips located between the outermost positions. It is thus readily possible to obtain the desired width of the bamboo strips at the outermost positions. This is particularly desirable if a bamboo mat is made in which all the bamboo strips, including the bamboo strips located at the outermost positions, must have a substantially equal width. It is for instance possible to envisage using strips with a width of 15 mm, wherein strips with a width of 17 mm are used at the outermost positions. In order to obtain a bamboo mat with a right angle it is now possible to remove about 2 mm from the outer strips, for instance by sawing, without the outer strips differing visually after this machining from the bamboo strips located between the outermost positions. When use is made of a mat in which all bamboo strips are the same, the width of at least one of the outermost bamboo strips will be smaller than average following the narrowing (sawing away). The smallest width of the bamboo strip is taken here as starting point; the extent of sawing-away is generally different at the outer ends of the bamboo strip due to the bend. When the width of the bamboo strips at the outermost positions of the bamboo strip is more than 0.5 mm smaller than the average width of the strips in the mat in 98% of the measurements, use is very probably made of the sawing-away according to the invention.

In a preferred embodiment, after processing step E), parts of bamboo are sawn off parallel in step G) on the opposite end surfaces of the bamboo mat at a predetermined angle to the longitudinal direction of the bamboo strips. A reproducible form of the bamboo mat is hereby obtained, whereby it becomes easier to lay a regular pattern. A particularly favourable angle is an angle of 90 degrees, but a large number of different geometric laying forms can also be envisaged for bamboo mats sawn off at an angle of 30, 45 or 60 degrees. Machining step G is preferably performed after machining step F since it is easier to measure the angle in step G) if the longitudinal sides have first been levelled in step F).

It is advantageous if the connected bamboo mat is rolled up after step E). A rolled-up bamboo mat can be stored or transported more compactly, optionally while awaiting further machining steps such as the above stated steps F and/or G.

The invention also provides the use of bamboo mats obtainable according to the method according to the invention for interior construction, in particular for manufacturing furniture, floor covering, wall covering and/or ceiling covering. Owing to the form-retention and reproducibility bamboo mats can be produced according to the invention with exact dimensions and relatively low tolerances. It is hereby possible to manufacture high-grade furniture or covering with relatively low tolerances and a good durability.

The invention further provides a bamboo mat obtainable in accordance with the method according to the invention, wherein a plurality of bamboo strips are positioned mutually adjoining and parallel and mutually connected using coupling means. As a result of the used method such a mat has the advantages as described above. A mat can have different dimensions and can for instance comprise 10, 100 or 1000 mutually connected bamboo strips.

In a preferred embodiment the mutual distance between adjoining bamboo strips is a maximum of 0.5 mm. Such a fitting connection of adjoining bamboo strips cannot be achieved with the known methods. The average mutual distance is preferably a maximum of 0.5 mm, more preferably the absolute mutual distance being a maximum of 0.5 mm. The greatest distance between adjoining bamboo strips is generally to be found at the position of nodes of the bamboo.

The bamboo strips in the bamboo mat preferably have a width between 2 and 22 mm, preferably between 10 and 20 mm, more preferably between 14 and 16 mm. A bamboo mat from strips enables efficient material use and also a minimal chance of deformation and material stress in the case of fluctuations in the relative air humidity, in particular between 50 and 65% moisture content relative to saturated air. A width between 14 and 16 mm is optimal. In the final product the bamboo strips preferably have substantially the same width. It is however also possible to envisage making a mat of bamboo strips with different widths.

It is advantageous if the bamboo strips in the bamboo mat have a thickness between 1 and 2.5 mm. At such a thickness the bamboo is flexible such that it lies substantially flat when laid on a surface. In the case of bamboo with a thickness greater than 2.5 mm the rigidity of the bamboo strips is such that laying them flat is more difficult, whereby pressure or adhesion to the surface is sometimes required in order to force the bamboo mat into the plane.

In a preferred embodiment the coupling means are flexible such that the bamboo mat can be rolled up. Rolling up and unrolling of the bamboo mat are thus easily possible. It is moreover simpler to lay the mat flat on a surface. Owing to the flexible coupling means the bamboo mat can adjust to small variations and irregularities in the surface. In the rolled-up position the bamboo mat can be stored and/or transported compactly. A rolled-up bamboo mat can for instance comprise between 100 and 1000 bamboo strips, which can be divided in further processing steps into smaller, more easily manageable bamboo mats, each comprising for instance between 10 and 20 bamboo strips.

In a preferred embodiment the coupling means comprise adhesive tape, wherein the adhesive tape spans a plurality of adjoining bamboo strips. An exceptionally firm fixation of the bamboo strips is thus effected.

It is recommended that the coupling means comprise a flexible material layer which substantially covers adjoining bamboo strips on at least one side. In addition to the coupling function, the flexible material layer can also have other functionalities such as water sealing and/or heat insulation.

It is advantageous if the bamboo mat has a rectangular form. Surfaces can be fully covered in simple manner with a rectangular form.

The invention further provides a product manufactured from a bamboo mat according to any of the foregoing claims, in particular furniture, floor covering, wall covering or ceiling covering.

The invention will now be elucidated on the basis of the following non-limitative examples.

DETAILED DESCRIPTION

Figure 1A:
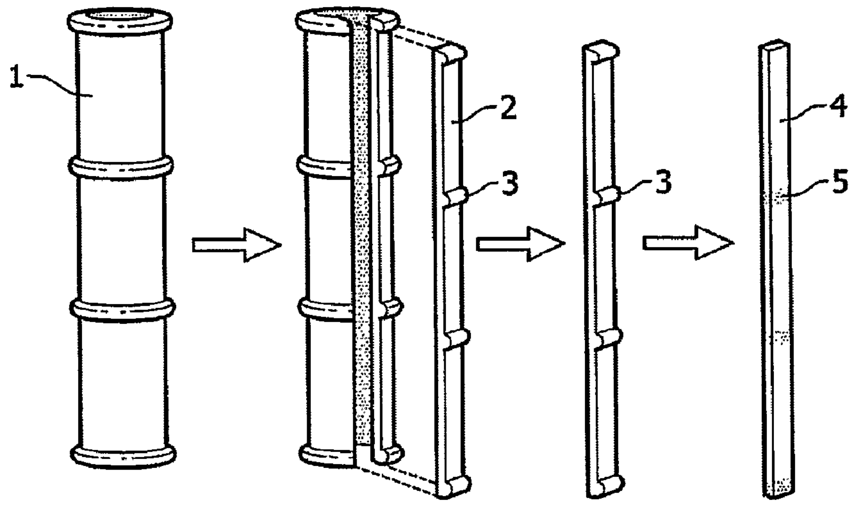
FIGS. 1*a-c* show the method for manufacturing a bamboo strip for a bamboo mat according to the invention.

FIG. 1*a* shows bamboo 1, from which an elongate part 2 is made for instance by milling, cutting and/or sawing. Elongate part 2 is made from a so-called 'wet' bamboo stem 1. This elongate part still has nodes 3. In a further process, wherein conventional techniques are used, elongate part 2 is machined to a rectangular bamboo strip 4 in which the locations of nodes 3 are still recognisable as zones 5 with a material density differing from the rest of the bamboo. Bamboo 1 is chosen such that a bamboo strip with a thickness between 1-2.5 mm can be cut therefrom. In the prior art the thus cut bamboo strips 4 are used directly for making products such as bamboo mats. This results in products of mediocre quality however, since these bamboo strips 4 from the wet bamboo stem 1 tend to deform, and particularly to warp. Deformations are also found to occur particularly at the location of zones 5 after a period of time, which can result in material stresses and greater inaccuracy and variation in the dimensioning of the strip.

Figure 1B:
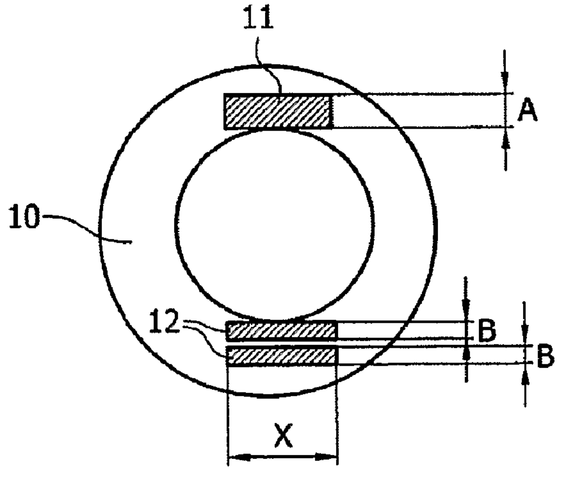

FIG. 1*b* shows a cross-section of a bamboo stem 10, wherein one or two bamboo strips 11,12 are manufactured from a wall thickness in the diameter direction. Instead of making one bamboo strip 11 with thickness A from the wall, two bamboo strips 12 are preferably made with a smaller thickness B. The thinner bamboo strips 12 with thickness B between 1-2.5 mm have the advantage that they can be dried quickly to the desired degree of humidity.

Figure 1C:
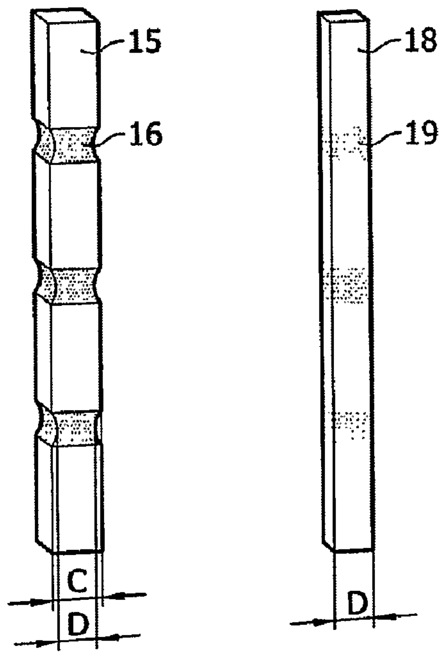

FIG. 1*c* shows a bamboo strip 15 after drying. Before drying, the bamboo strip 15 obtained from a 'wet' bamboo stem has a degree of humidity which can rise to 30%. The degree of humidity after drying preferably corresponds with the average humidity in the geographic location where the bamboo strips will be used. Bamboo strips are dried to a degree of humidity of 6-12% by weight, preferably between 6 and 10% by weight, most preferably to about 8%. Bamboo strips with such a degree of humidity are found generally to be readily applicable and result in minimal deformation. The drying process produces a greater shrinkage of the bamboo at the position of nodes 16 because the bamboo has a different composition and material density at these positions. This irregularity is planed off by reducing the width of the original width C to a new width D, wherein D is equal to or smaller than the smallest width at nodes 16. Assuming a width D of for instance 22 mm, 1 to 3 mm of material must be removed on either side, whereby the width is for instance reduced from 17 mm to 15 mm. The thickness is generally also planed away or sanded down since irregularities can also occur in this direction, albeit smaller than in width direction D. The final product is a bamboo strip 18 with width D which, also without further chemical treatment, has a relatively stable form in the intended environment of use compared to the prior art bamboo strips which are processed into products directly from the 'wet' bamboo stem.

Figure 2A:
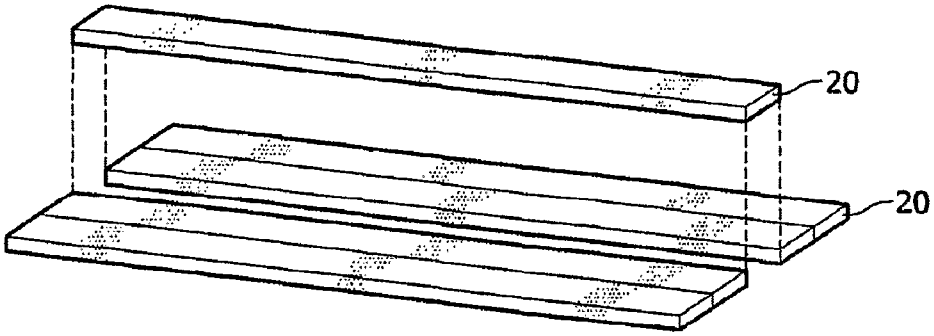
FIGS. 2*a-d* show the method for manufacturing a bamboo mat according to the invention.
Figure 2B:
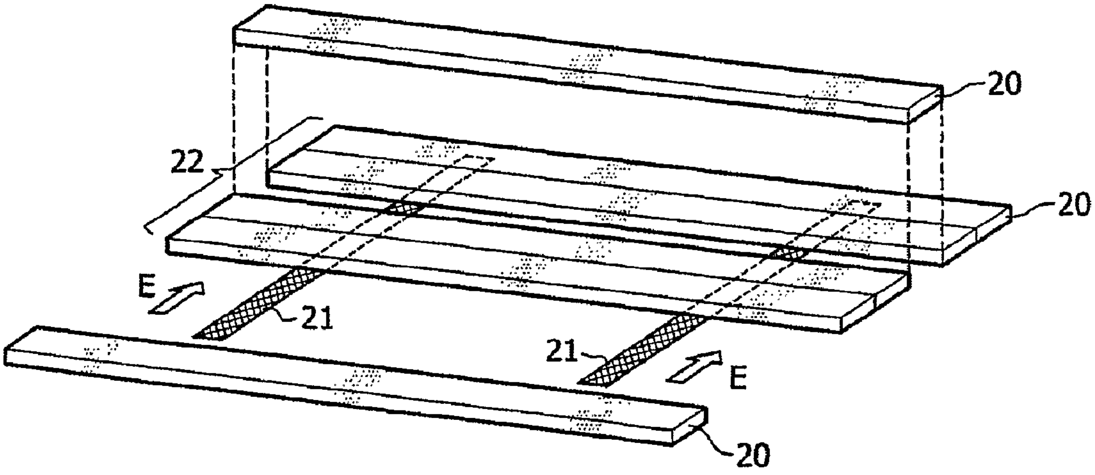

FIGS. 2*a-d* show the processing of the bamboo strips manufactured in FIGS. 1*a*-1*c* into a bamboo mat according to the invention. In FIG. 2*a* bamboo strips 20 according to the invention (comparable to bamboo strip 18 of FIG. 1*c*) are positioned parallel and adjacently in a plane. In FIG. 2*b* bamboo strips 20 are mutually connected by arranging adhesive tape 21 on one side of the adjacently positioned strips so as to thus form mats 22. This is possible in a batch process, although it is also particularly suitable for a continuous process in which new bamboo strips 20 are added one at a time to the mat as according to arrow E and fixed with tape 21. Because the bamboo strips according to the invention are particularly form-retaining, it is possible to use much smaller distances between adjoining bamboo strips. In the known bamboo strips processed directly from the wet bamboo stem, this is not possible because they have too many irregularities and deform too much in the course of time.

Figure 2C:
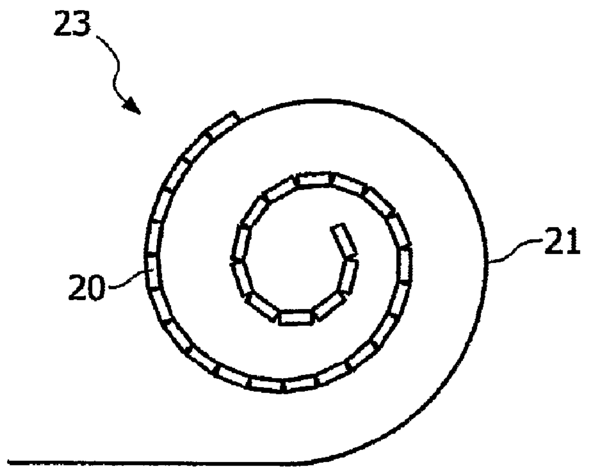

The connection made by tape 21 is flexible in the direction at right angles to the longitudinal direction of bamboo strips 20 so that mat 22 can be rolled up to form a roll 23, as can be seen in FIG. 2*c*. Such a roll 23 is easy to transport and makes it easier to process bamboo strips 20 simultaneously or in a continuous process. Roll 23 can optionally be divided into smaller units later for further processing. Although in this mat only a few bamboo strips 20 are incorporated into bamboo mat 22, it is possible to envisage manufacturing much larger mats than shown, with for instance hundreds or thousands of mutually connected bamboo strips 20. These can be divided into smaller, more manageable units at a later stage (for instance after transport and/or storage) for further processing or use in for instance covering for floors, walls or ceilings, or in the construction of furniture such as a table, cabinet, couch or chair.

Figure 2D:
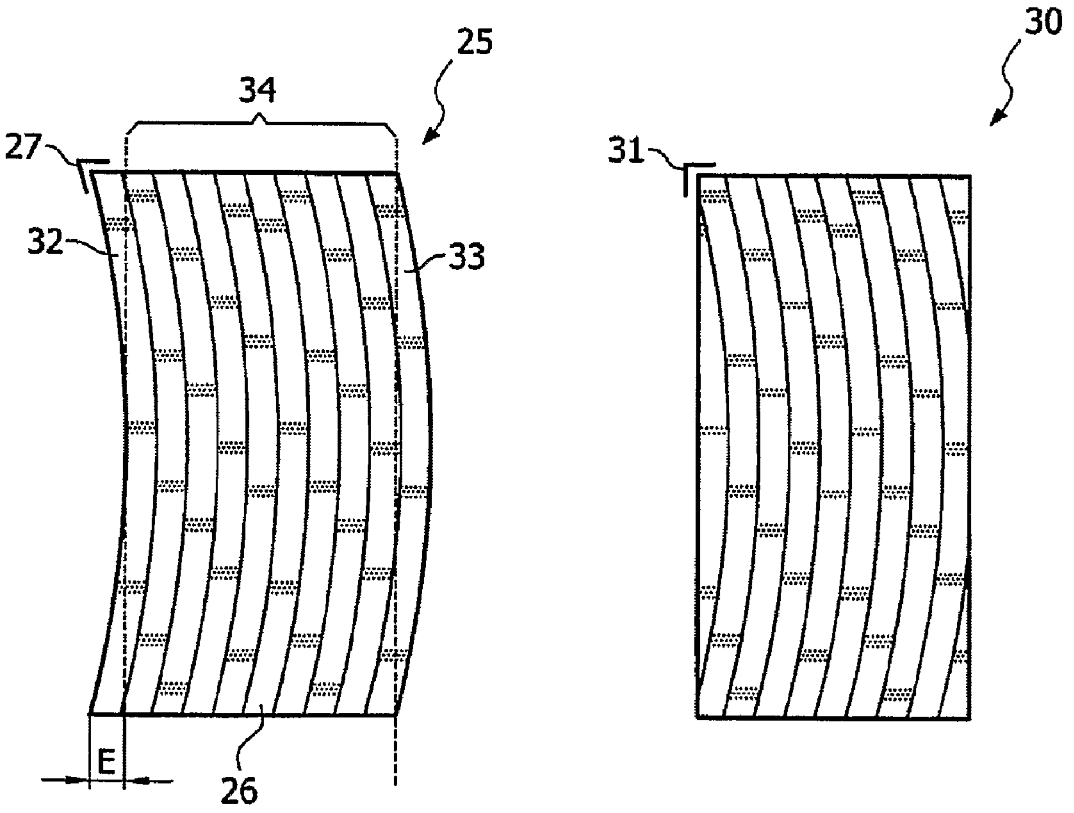

FIG. 2*d* shows another further processing of bamboo mat 25. Bamboo strips 26 tend to curve slightly to a particular side (exaggerated in FIG. 2*d*). This curvature which occurs naturally in bamboo is known as "banana-forming". The corner points of mat 27 are hereby not precisely 90 degrees, which makes a geometric pattern impossible when laying multiple mats 25. This problem is solved by first parallel sawing a distance E of for instance 1 or 2 mm from both sides (depending on the extent of "banana-forming").

In this example extra-wide bamboo strips of 17 mm are used on bamboo strips 32, 33 located at the outermost positions of mat 27, wherein the rest of strips 34 each have a width of about 15 mm. This provides the option of sawing off 2 mm on both sides in order to obtain a rectangular mat, without the outermost bamboo strips here having a greatly differing width. In the figure the sawing is shown in very extreme form: only a fraction of at most a few millimeters (for instance 1 mm or 2 mm) will generally have to be sawn off the bamboo strips 32, 33 located at the outermost positions. Because the longitudinal sides are straight and run parallel, the end surfaces can then be sawn, planed or ground at the desired angle. In this example a rectangular mat 30 is obtained with a right-angled corner 31. Using such a mat it is particularly easy to apply the mats for the purpose of covering floors, walls and/or ceilings, since a plurality of mats can be placed connecting together more easily. The same technique can also be applied for the manufacture of mats 30 with other regular geometric forms with parallel sides but with angles other than 90 degrees, such as a parallelepiped, trapezium or a diamond shape.

Figure 3A:
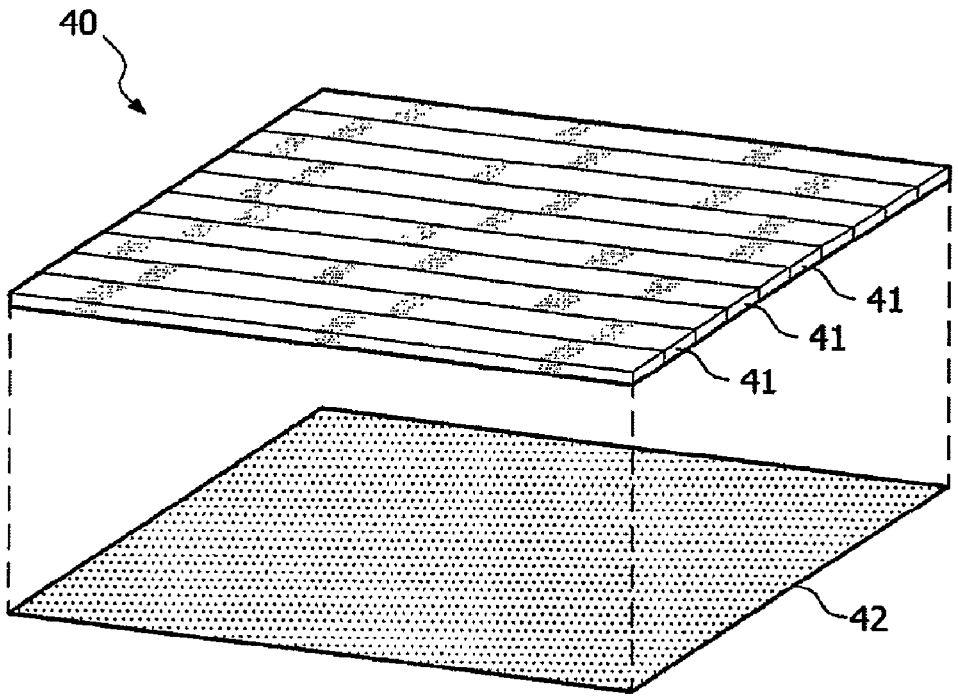
FIGS. 3*a* and 3*b* show a method for manufacturing bamboo tiles according to the invention.

FIG. 3*a* shows the manufacture of a bamboo mat 40, wherein a strengthening layer 42 is arranged on one side of bamboo strips 41 as a coupling means. This strengthening layer 42 is preferably a fibre-reinforced plastic or natural fabric such as jute. Strengthening layer 42 can for instance be arranged on bamboo strips 41 by means of glueing. It is also possible to place a plurality of strengthening layers, optionally with added functionality such as heat insulation or moisture-proof and anti-fungal function. All these layers are preferably flexible such that the mat can be rolled up.

In a test a batch of bamboo was divided into two test groups which were processed into bamboo mats, wherein steps B and C were omitted for the control group. An average distance between the adjoining bamboo strips of between 0.5 and 1 mm was found for the non-dried and non-machined bamboo mats, and an average distance of less than 0.5 mm was found for the bamboo mats according to the invention.

Figure 3B:
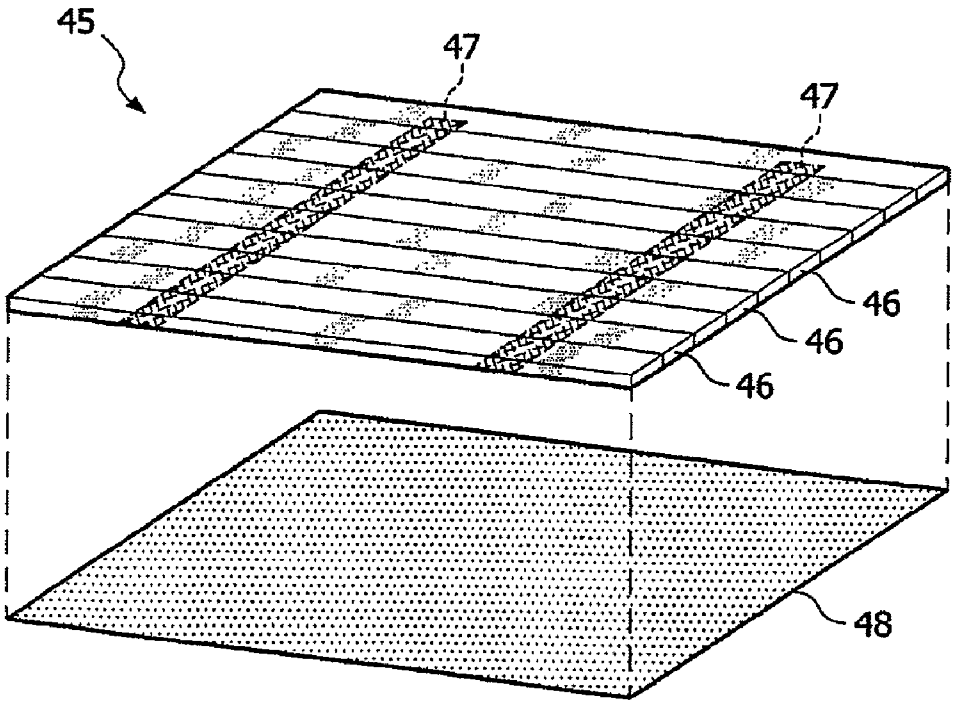

FIG. 3*b* shows another preferred embodiment of a strengthened bamboo mat 45, wherein bamboo strips 46 are first mutually connected by means of an adhesive tape 47 (similarly to FIG. 2*b*), after which a strengthening layer 48 is then arranged. This method has the advantage that tape 47 fixes bamboo strips 46 during the placing, whereby placing of strengthening layer 48 is easier.

What is claimed:

1. Method for manufacturing a bamboo mat, comprising the processing steps of A) processing bamboo into bamboo strips, B) drying the bamboo strips to a predetermined moisture content, C) machining at least the longitudinal sides of the bamboo strips dried according to step B) so as to form a uniform plane, D) parallel positioning of a plurality of machined bamboo strips with the longitudinal sides adjoining, E) mutually and pivotally connecting the parallel positioned bamboo strips by means of coupling means, wherein, after the connecting as according to step E), the bamboo mat is narrowed to a predetermined width in a subsequent step F) by removing bamboo on either side parallel to the longitudinal direction of the bamboo strips.

2. Method as claimed in claim 1 characterized in that during the drying in step B a width of the bamboo strip is smaller at the position of at least one node in the bamboo than a maximum width of the bamboo strip, wherein during the machining in step C) bamboo is removed on the longitudinal sides of the bamboo strip until the bamboo strip has substantially the same width over the longitudinal direction.

3. Method as claimed in claim 2, characterized in that during drying in step B a thickness of the bamboo strip at the position of at least one node in the bamboo is also smaller than a thickness of the bamboo strip between the nodes, wherein during the machining in step C bamboo is removed from the top side and bottom side of the bamboo strip adjacent to the longitudinal sides until the bamboo strip has substantially the same thickness over the longitudinal direction.

4. Method as claimed in claim 1, characterized in that the predetermined moisture content in step B) lies between 6 and 12% by weight.

5. Method as claimed in claim 1, characterized in that the coupling means in step E) comprise adhesive tape, wherein the adhesive tape is arranged over a plurality of adjoining bamboo strips such that the bamboo strips are coupled pivotally to each other.

6. Method as claimed in claim 1, characterized in that prior to the narrowing in step F) the bamboo strips of the bamboo mat which are located at the outermost positions have a greater width than the bamboo strips located between the outermost positions, wherein the bamboo strips located at the outermost positions are narrowed during the narrowing of the bamboo mat to a width substantially equal to the width of the bamboo strips located between the outermost positions.

7. Method as claimed in claim 1, characterized in that after processing step E), parts of bamboo are also sawn off parallel in step G) on the opposite end surfaces of the bamboo mat at a predetermined angle to the longitudinal direction of the bamboo strips.

8. Method as claimed in claim 1, characterized in that the connected bamboo mat is rolled up after step E).

9. Method as claimed in claim 1 further comprising the step of using the bamboo mat in at least one of furniture, a floor covering, a wall covering and a ceiling covering.

10. Method as claimed in claim 1, characterized in that the coupling means in step E) comprise a flexible material layer which substantially covers adjoining bamboo strips on at least one side.

* * * * *